July 19, 1932.  P. W. FLEISCHER ET AL  1,868,284
BOX COVERING MACHINE
Filed March 25, 1931   11 Sheets-Sheet 11
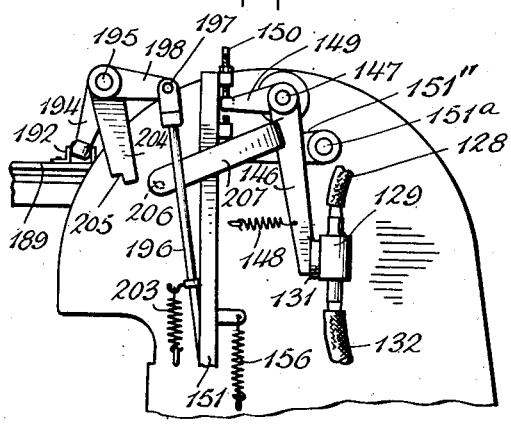
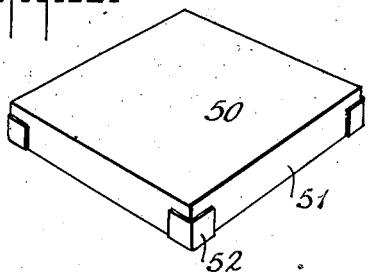
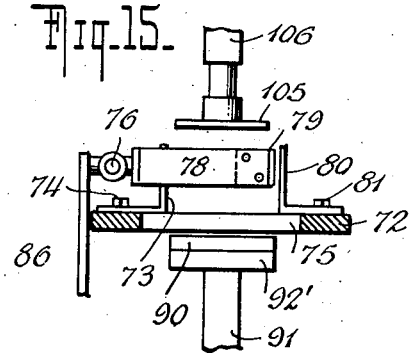
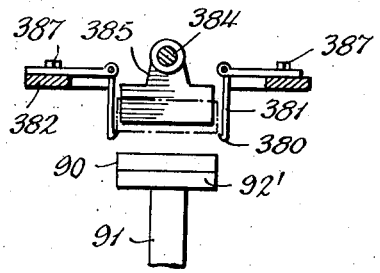
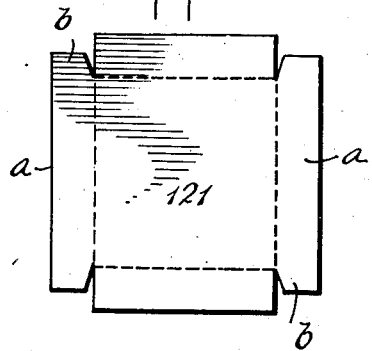
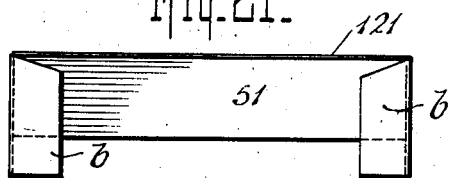
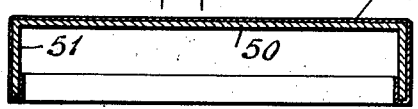
INVENTORS
PAUL W. FLEISCHER and MARTIN FEYBUSCH
BY
ATTORNEYS Patented July 19, 1932

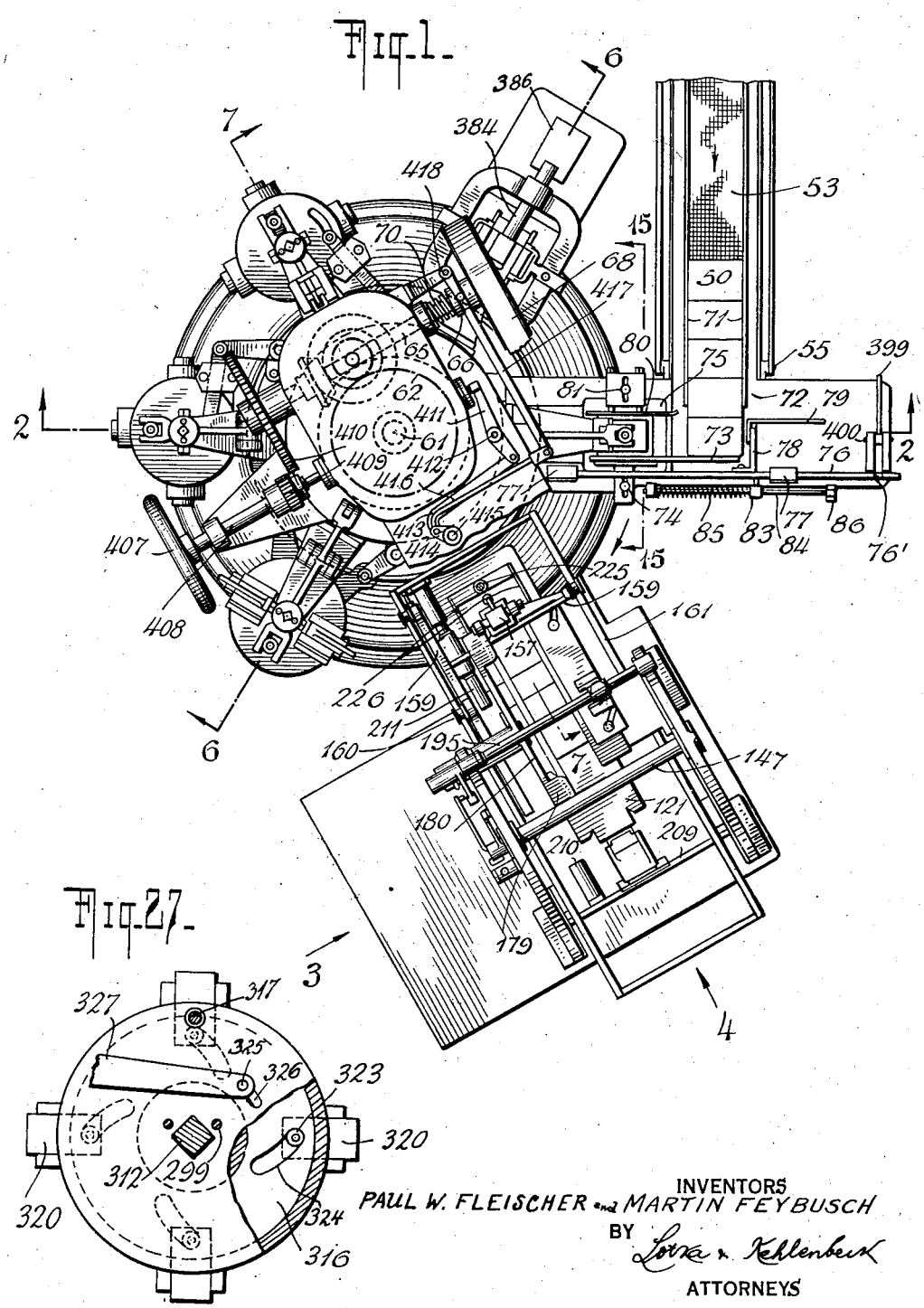

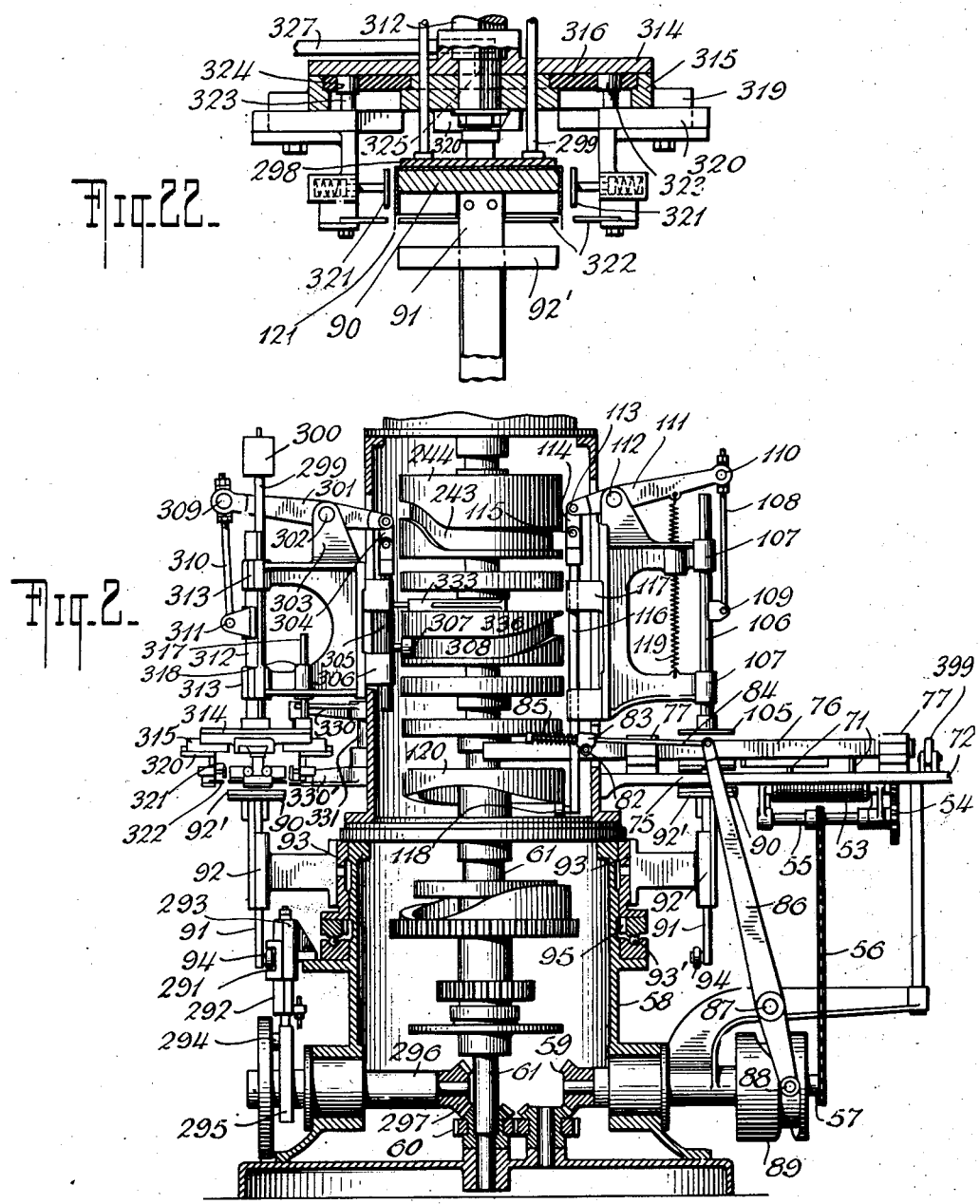

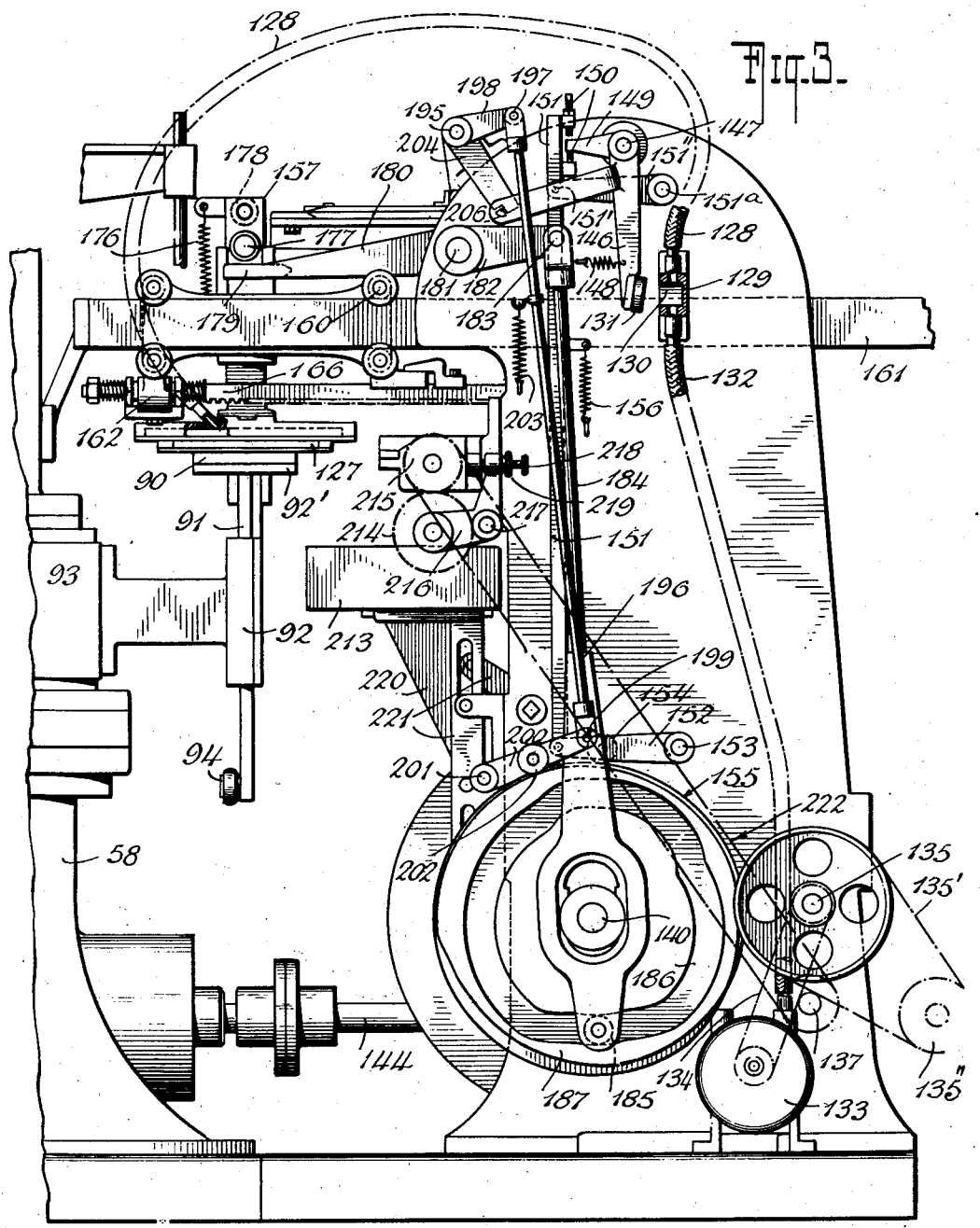

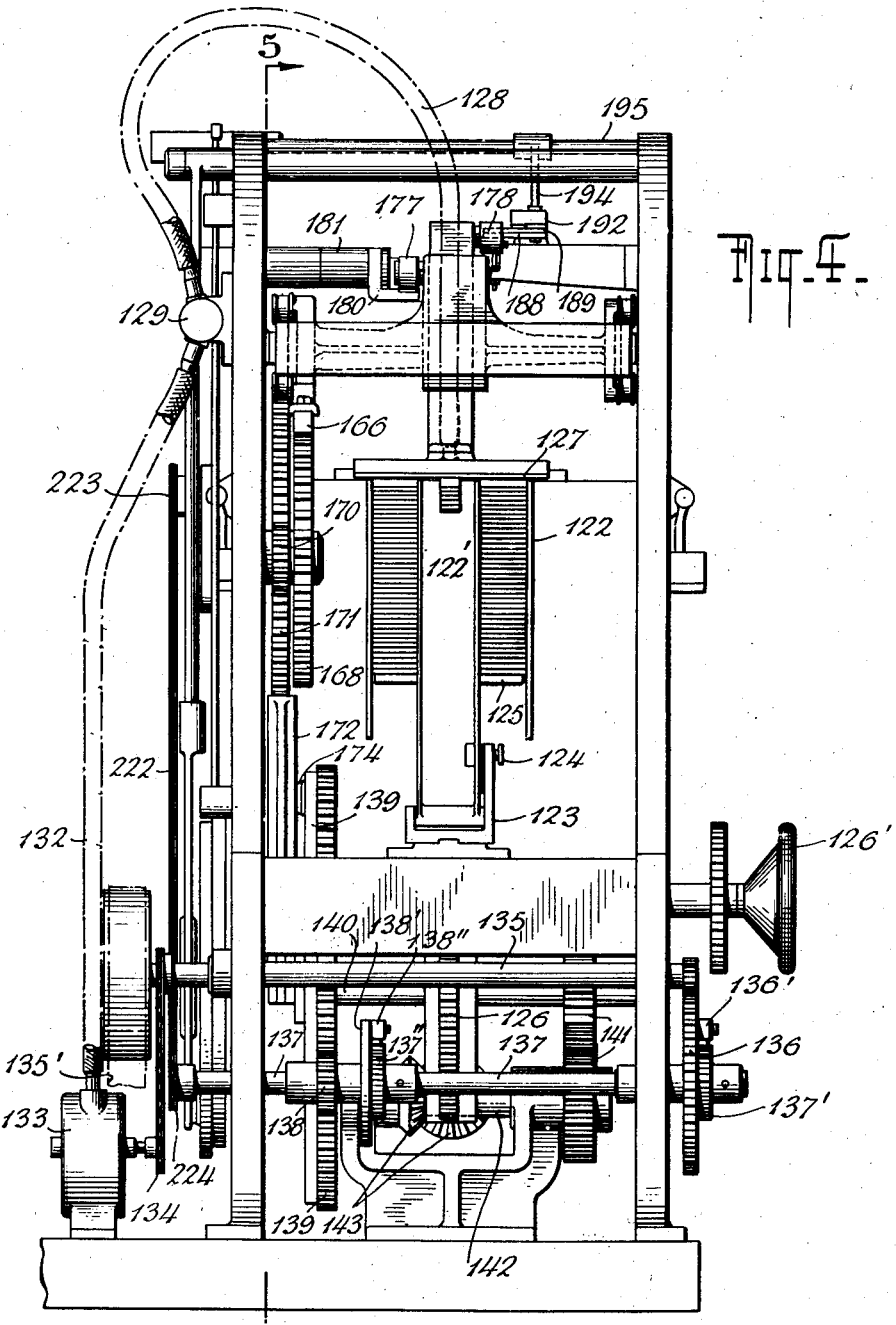

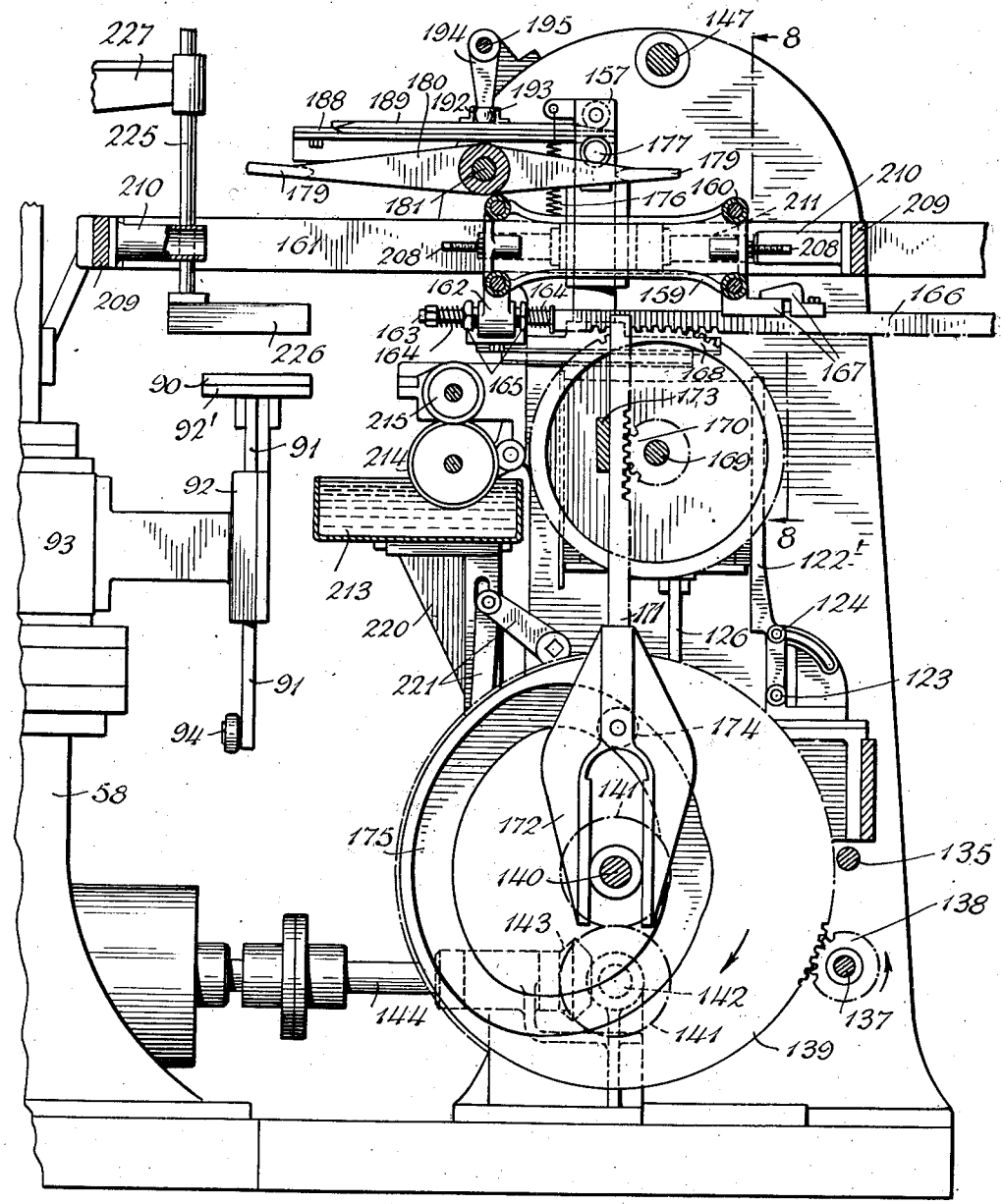

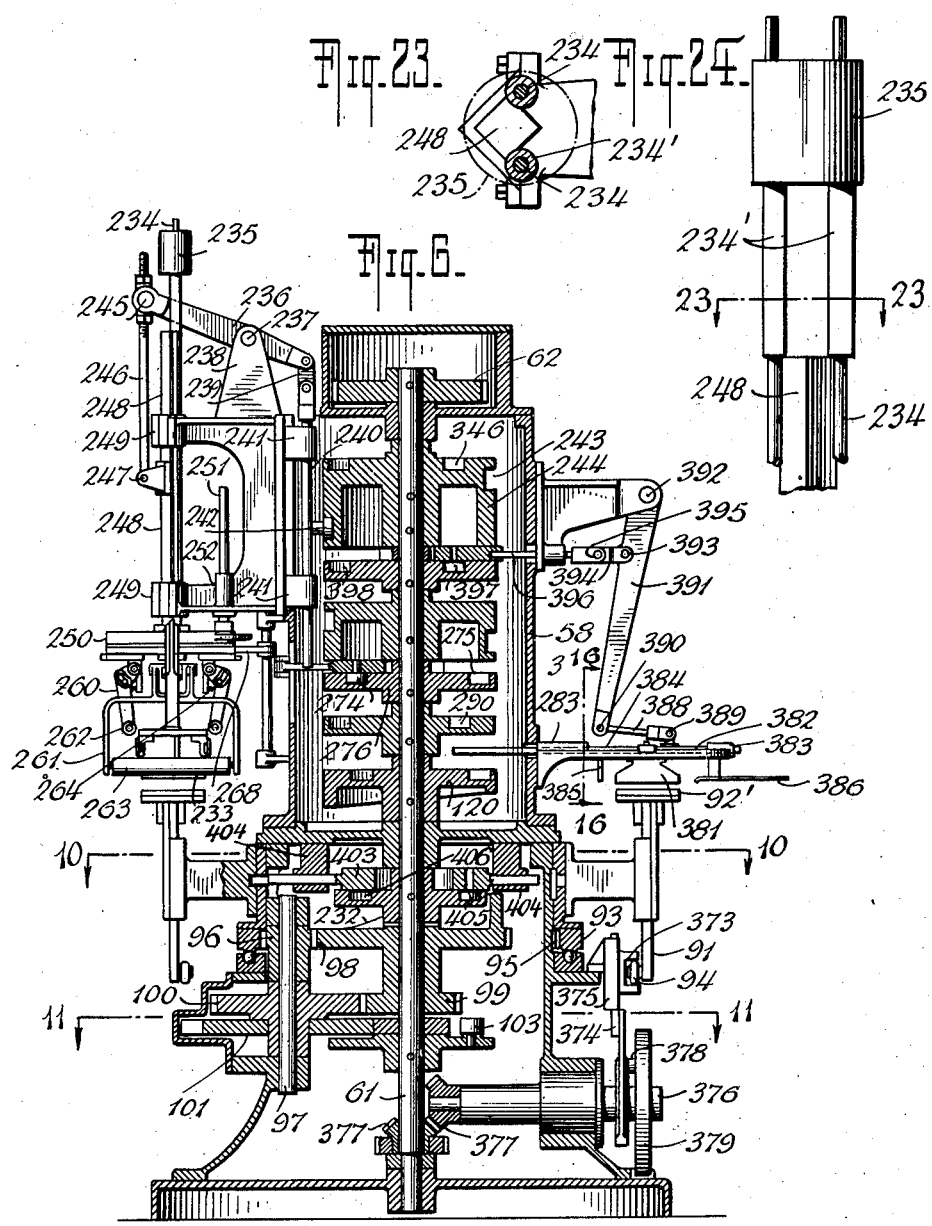

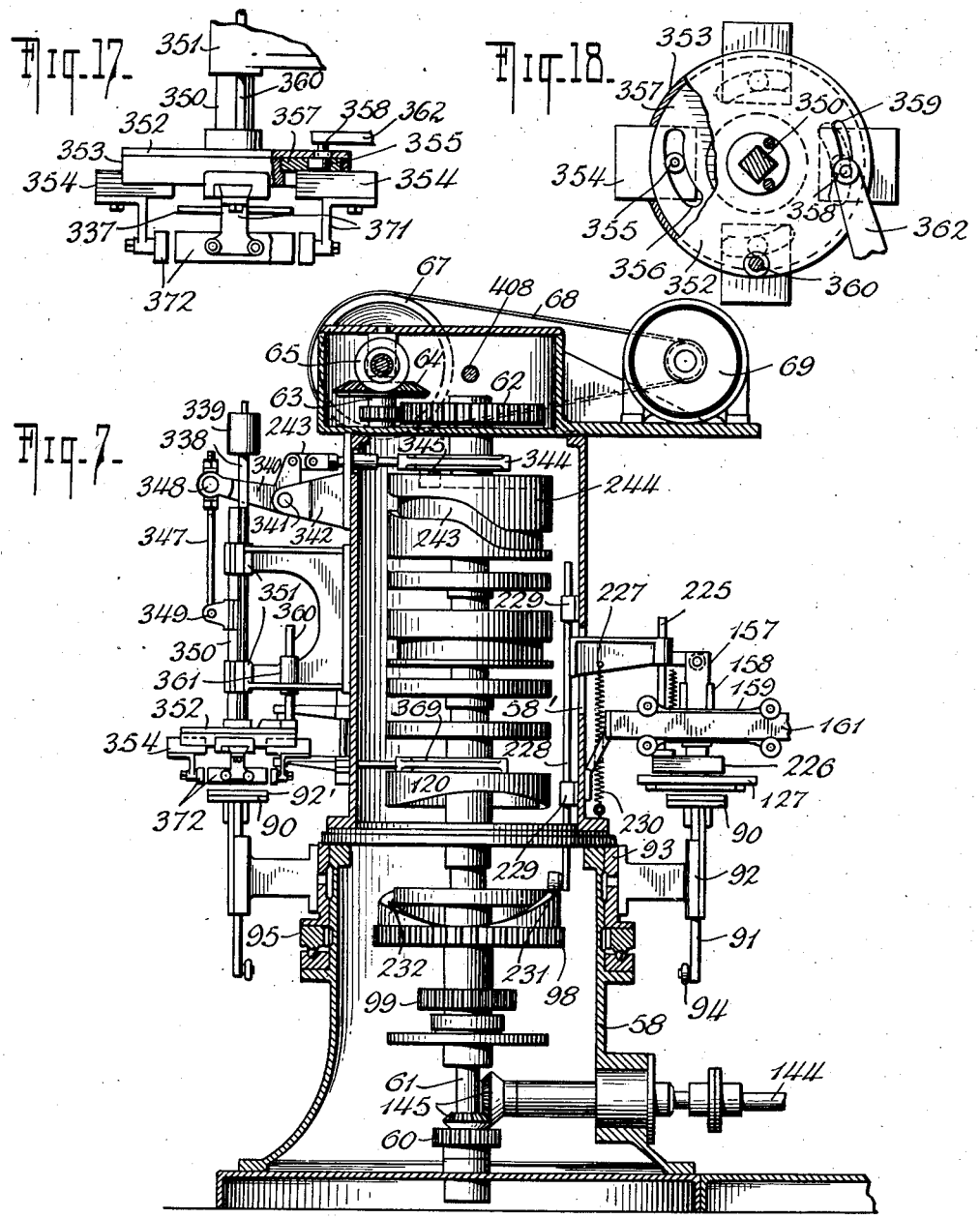

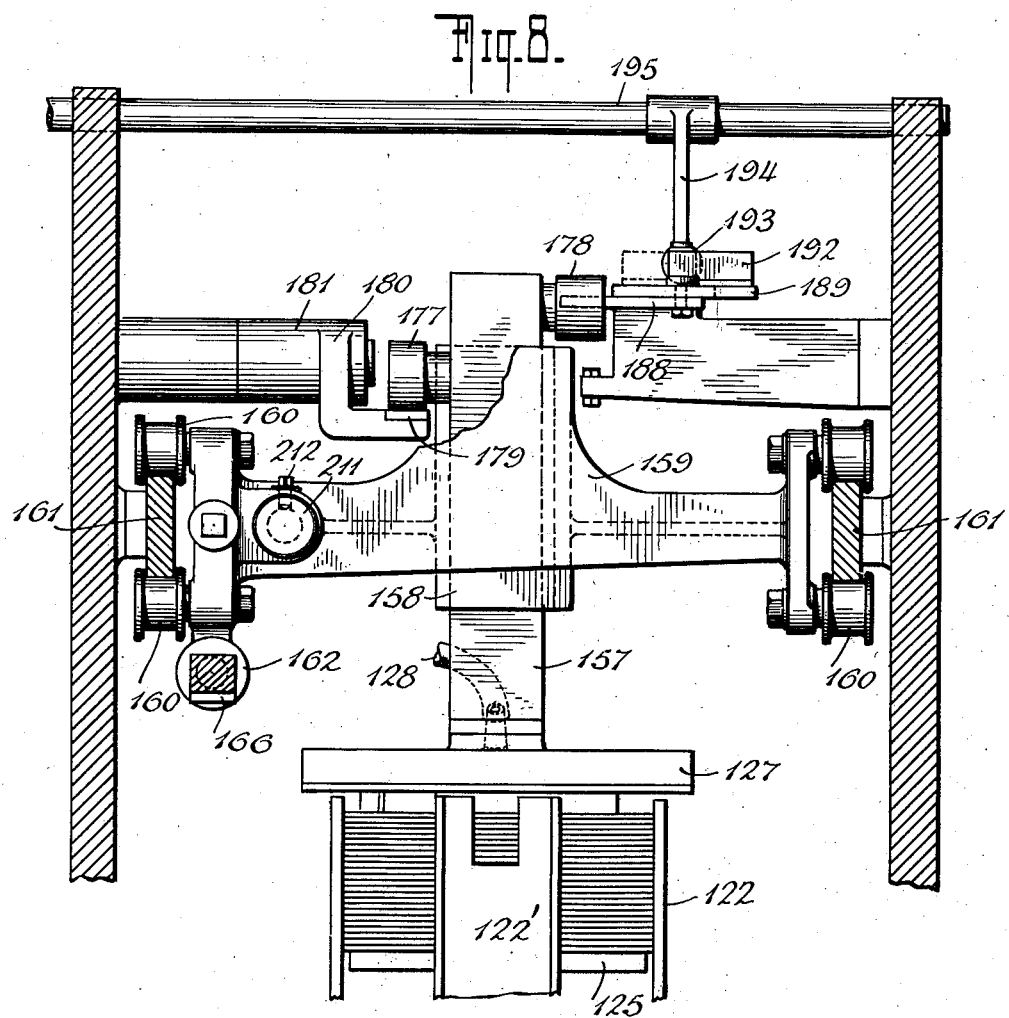

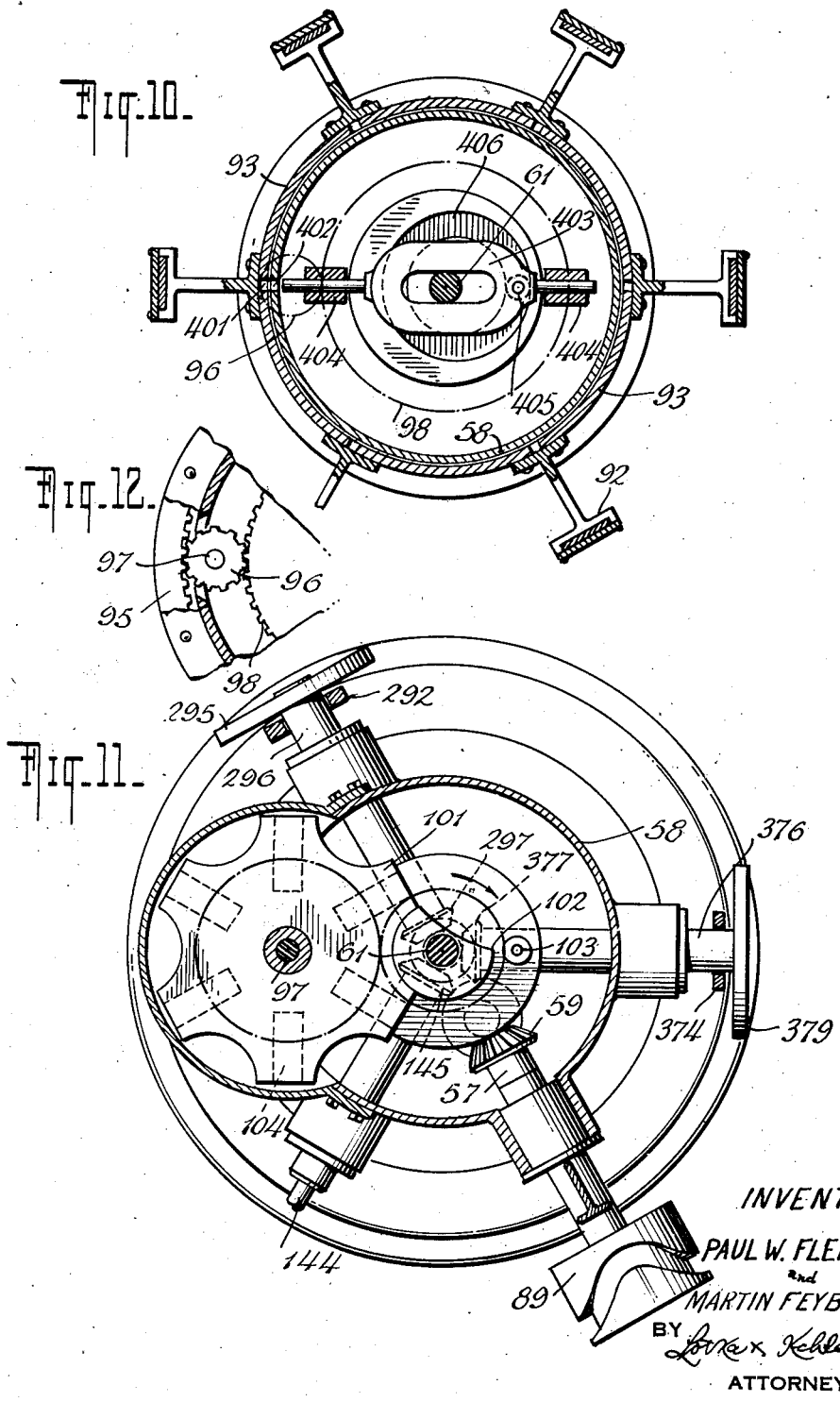

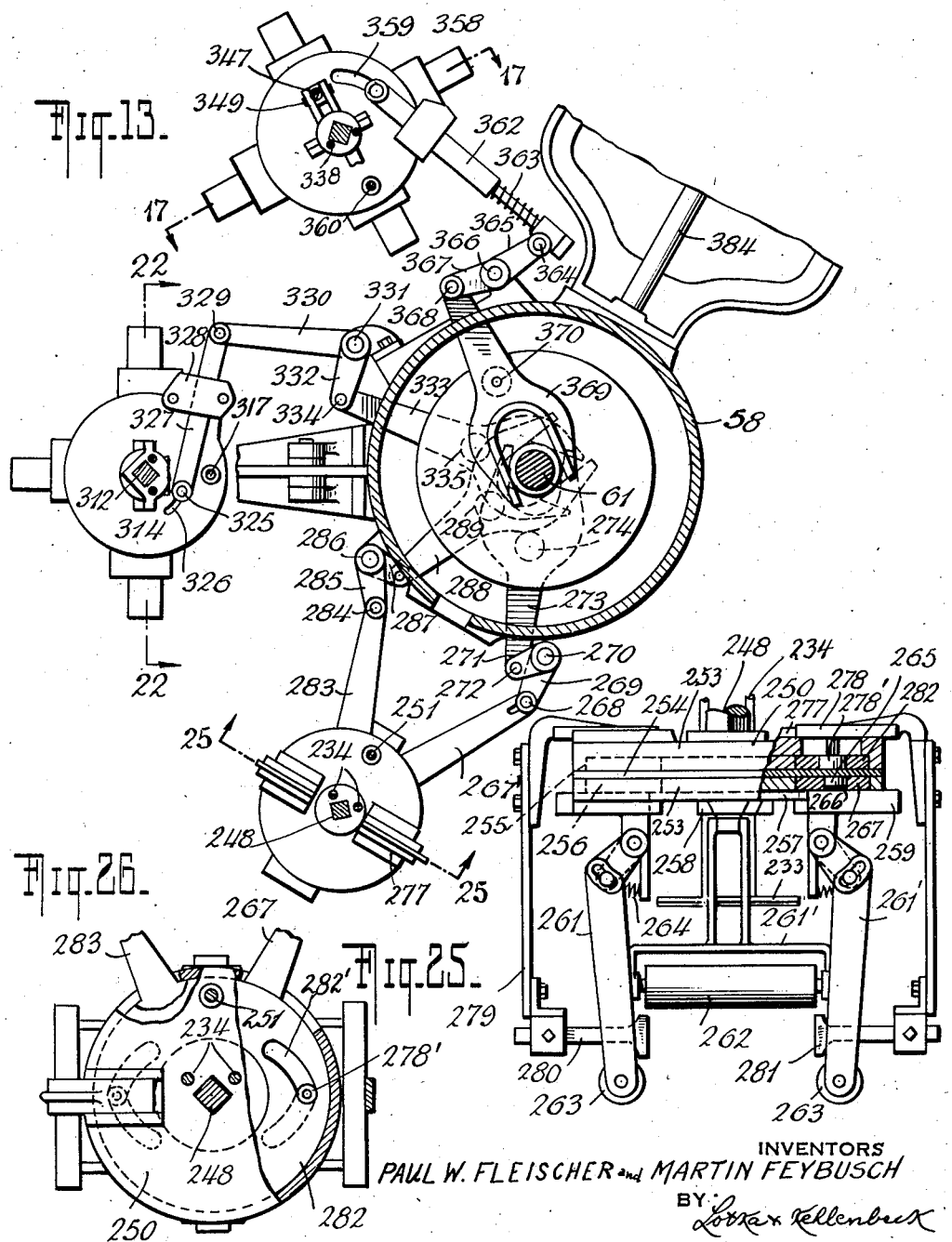

1,868,284

UNITED STATES PATENT OFFICE

PAUL WERNER FLEISCHER AND MARTIN FEYBUSCH, OF WEEHAWKEN, NEW JERSEY, ASSIGNORS TO NEW JERSEY MACHINE CORPORATION, OF HOBOKEN, NEW JERSEY, A CORPORATION OF NEW JERSEY

BOX COVERING MACHINE

Application filed March 25, 1931. Serial No. 525,050.

Our invention relates to machines for applying to boxes, generally of square or oblong shape, covers made of paper or like material which is glued to the box bodies. The object of our present invention is to simplify machines of the above-indicated class and to render them more reliable in operation. The improved machine is designed for the same class of work as the machine disclosed in Letters Patent of the United States No. 1,279,312 issued to one of us, the said Martin Feybusch, on September 17, 1918.

In the preferred embodiment of our invention, as described in detail hereinafter, the entire operation is conducted in six steps, performed at six successive "stations," instead of seven, as in the patent mentioned above. At the first station, box bodies are fed to the proper position; at the second station, box covers are gummed and applied to the box bodies in a flat state; at the third station, all the projecting sides (generally four) of the box cover are folded against the sides of the box body and glued thereto, the projecting corners of some of the sides being tucked under the other sides of the cover; at the fourth station, the edge portions of the cover, which extend beyond the free edges of the box body, are first bent inwardly to a position parallel with the bottom of the box body and then turned in to engage the inner surfaces of the sides of the box body, to which they are glued; at the fifth station, pressure is exerted to cause the box cover to adhere firmly and smoothly to the box body; and at the sixth station, the covered box is ejected. In the preferred form of our present invention, the box bodies are fed to a rotary member which is moved intermittently to carry the box bodies from one station to the next. The use of such a rotary member simplifies the construction and also gives great rigidity to the said member or carrier which brings the box bodies to the successive stations. Our present invention also includes improvements in the individual devices operating at the several stations, as described below. In particular, we have devised a novel and very efficient mechanism for carrying the box covers to the box bodies which mechanism preferably has a suction head to pick up the box covers, and includes special provision to prevent automatically contact of the suction head with the cover-gumming appliance in the event that such suction head should fail to pick up a box cover. These and various other features of our invention will appear more fully from the detailed description following hereinafter and from the appended claims.

A satisfactory and typical example of our invention is illustrated by the accompanying drawings, in which Fig. 1 is a plan view of the entire machine; Fig. 2 is a vertical section on line 2—2 of Fig. 1; Figs. 3 and 4 are partial elevations, on an enlarged scale, looking in the direction of the arrows 3 and 4 respectively of Fig. 1; Fig. 5 is a vertical section on line 5—5 of Fig. 4; Figs. 6 and 7 are vertical sections on lines 6—6 and 7—7 respectively of Fig. 1; Fig. 8 is a detail elevation, on a still larger scale, with parts in section on line 8—8 of Fig. 5; Fig. 9 is a detail plan view of certain parts shown at the upper portion of Fig. 8; Figs. 10 and 11 are horizontal sections (upon enlarged scales) on lines 10—10 and 11—11 respectively of Fig. 6; Fig. 12 is a detail plan view (with parts in section) of certain elements shown in Fig. 10; Fig. 13 is a partial plan view of the machine, with parts in section; Fig. 14 is a detail elevation, looking in the same direction as Fig. 3, but with the parts in a different position; Fig. 15 is a detail vertical section on the line 15—15 of Fig. 1; Fig. 16 is a detail vertical section on line 16—16 of Fig. 6; Fig. 17 is a vertical section on line 17—17 of Fig. 13; Fig. 18 is a plan of the elements shown in Fig. 17, with parts in section and others broken away; Fig. 19 is a perspective view of a box blank or box body such as may be covered by the use of our improved machine; Fig. 20 is a plan view of a label or box covering such as is applied to said blank or body by our machine; Fig. 21 is a side elevation of a box body and the covering applied thereto, as they appear at an intermediate stage of the operation, Fig. 21ᵃ is a vertical section of the same parts as they appear at the end of the operation; Fig. 22 is a vertical section on line 22—22 of Fig. 13; Fig. 23 is a horizontal section on line 23—23 of Fig. 24, the latter being a side elevation, upon an enlarged scale, of certain parts shown in Fig. 6; Fig. 25 is a partial elevation, with parts in section on line 25—25 of Fig. 13; Fig. 26 is a plan view of the elements shown in Fig. 25; and Fig. 27 is a plan view of the elements shown in Fig. 22.

At the first station is located the box feeding mechanism (Figs. 1, 2 and 15). The box blank or box body may be of the type shown in Fig. 19, where 50 is the bottom of the box body, 51 the sides, and 52 strips of cloth or other suitable material which are glued to the corners of said body. The box body is open at the top (opposite the bottom 50). These box bodies are placed, bottom upward, on the upper run of a feed belt 53, to which a continuous movement is imparted in any suitable manner, for instance by means of gearing 54 (Fig. 2) for driving one of the belt-supporting rollers from a shaft 55 which by means of a chain 56 receives its motion from a shaft 57 journaled in the central pillar or housing 58. By means of bevel gearing 59 and spur gearing 60, shaft 57 is driven from the central vertical shaft 61. The latter is driven by means of spur gears 62 (Figs. 1 and 7), a short vertical shaft 63, bevel gearing 64 and a horizontal shaft 65 having a connection, controlled by a clutch 66, with a pulley 67 mounted loosely on said shaft and driven by means of a belt 68 from the motor 69. A spring 70 normally keeps the clutch engaged.

Stationary upright guides 71 (Fig. 1) engage the box bodies on opposite sides and hold them against lateral movement. These guides extend beyond the delivery end of said upper run of the belt 53, over a portion of a platform 72 on to which the box bodies are pushed by the movement of said belt. The feed movement of said box bodies is arrested when the front box body comes in contact with a stationary stop bar 73 extending transversely to the direction in which the belt feeds the box bodies. Preferably the stop bar 73 is adjustable lengthwise of said direction of feed, as by the slot-and-set screw connection indicated at 74.

At one side (the left in Fig. 1) of the position in which the front box body is arrested by the stop 73, the platform 72 has an opening 75 of sufficient size to allow the box body to pass therethrough. The transfer of said body from the position against the stop 73, as shown in Fig. 1, to a position in registry with the opening 75 is effected by the following pusher mechanism, the stop bar 73 acting as a guide for the box body during such transverse movement: A bar 76 is slidable in stationary brackets 77, transversely to the direction of travel of the feed belt 53. By means of a bracket 78 extending over the stop 73, said bar 76 is connected with a pusher head 79 adapted to engage the box body on the side opposite to the opening 75 and to move it toward said opening. During such movement, the box body is guided by the stop bar 73 and also by an opposing stationary guide bar 80, which preferably is adjustable toward and from the stop bar, as by the slot-and-set screw connection indicated at 81.

On the pusher bar 76 is pivoted at 82 a sleeve or guide 83 in which is mounted to slide lengthwise a rod 84, an elastic connection, such as a spring 85 coiled on said rod between the guide 83 and a head at one end of the rod, being interposed between said rod and the pusher bar. The other end of the rod 84 is connected pivotally with the upper end of a lever 86 fulcrumed at 87 and provided with a roller 88 engaging a groove on a cam 89 secured to the shaft 57.

Adapted to register at certain times with the opening 75 are cores 90 of proper shape to fit inside a box blank, each of said cores being carried by the upper end of a rod 91 mounted to slide vertically in a guide 92 secured to a sleeve or carrier 93 surrounding the pillar 58, and rotatable thereon about the axis thereof, on bearing balls 93'. The lower end of the rod 91 carries a roller 94 for imparting up and down movement to said rod. Normally, the core 90 is in its lowermost position in which it rests on a plate 92' rigid with the guide 92, said plate being of the same shape and size as the core, their outlines being flush with each other. The machine illustrated has six cores 90 spaced equally (at 60° apart) along the periphery of the sleeve 93. The latter has internal gear teeth 95 (Figs. 2, 6 and 12) in mesh with a pinion 96 on a shaft 97. This pinion also meshes with a spur gear 98 loose on the shaft 61. Connected rigidly with said spur gear is a pinion 99 in mesh with a spur gear 100 on the shaft 97. The wheels 96, 100 must be loose relatively to each other, that is to say, at least one of them must be loose on the shaft 97. With the spur gear 100 is connected rigidly a Geneva wheel 101 (Fig. 11) co-operating with a holding segment 102 rigid with the shaft 61, a roller 103 the journal pin of which is connected rigidly with said shaft, serving to drive the wheel 101 intermittently, by engagement with radial grooves 104 in said wheel, in a well-known manner. The Geneva wheel 101 has six teeth, so that at each complete revolution of the shaft 61, the spur gear 100 and the sleeve 93 will be given one-sixth of a revolution, the gear ratio between 100 and 99 on one hand, and 96, 98 on the other hand being so selected that the sleeve 93 and the Geneva wheel 101 will have the same angular movement.

When one of the cores 90 is in registry with the opening 75 as in Figs. 1 and 2, it is in vertical axial alignment with a plunger 105 mounted on the lower end of a rod 106 sliding in stationary guides 107. This rod is operated by a link 108 one end of which is pivotally connected with the plunger rod at 109 while the other end has a like connection at 110 with a lever 111 fulcrumed at 112. At 113 this lever is pivotally connected with a link 114 having a similar connection at 115 with a rod 116 mounted to slide vertically in stationary guides 117. The lower end of the rod 116 carries a roller 118 which by the action of a spring 119 connected with the lever 111 is pressed against a cam 120 secured rigidly to the shaft 61. At the proper time, once during each revolution of the shaft, the plunger 105 is moved down by the cam 120 to push a box blank through the opening 75 on to the core 90 which at that time is resting on the plate 92′ and is clear of the platform 72 as shown in Fig. 2. The plunger then rises out of contact with the box blank so that the core 90 with the box blank thereon may be carried to the next station by the partial revolution of the sleeve 93 through an angle of 60°.

At the second station is located the mechanism for gumming a label and applying it to a box blank on the core 90, 92′. This mechanism (Figs. 1, 3, 5, 7, 8, 9 and 14) is constructed as follows: Label or box coverings 121 of the shape shown in Figs. 1 and 20 are stacked in a magazine 122. For the ready insertion of labels, one side of the magazine, 122′, may be moved away, as by swinging on a pivot 123, a nut 124 serving to secure said side in its normal upright position. The labels are supported on a follower 125 which is fed or "indexed" upward by any well-known or approved mechanism, of which the rack bar 126 and the hand wheel 126′ may form a part. Since my invention does not relate to such indexing mechanism, the latter has not been shown in full. The uppermost label or box covering 121 is adapted to be picked up and removed from the magazine 122 by a suction head 127 open at the bottom, the interior of said head being in communication by a flexible tube 128 with a stationary connector 129 the cavity or chamber 130 of which is open to the outside air, or closed thereto, according to the position of a valve 131. Said chamber is in permanent communication by a tube 132 with the suction port of an air pump 133 driven by means of a chain 134 from a shaft 135 which is rotated continuously by means of a belt 135′ and a motor 135″ (say, an electric motor). By gearing or other suitable connection, motion is transmitted from the shaft 135 to a wheel or sleeve 136 mounted loosely on a shaft 137 on which is secured rigidly a ratchet wheel 137′, in engagement with a pawl 136′ carried pivotally by the wheel or sleeve 136. The shaft 137 carries rigidly another ratchet wheel 137″, and loosely another sleeve 138′ carrying pivotally a pawl 138″ in engagement with said ratchet wheel. The sleeve 138′ carries rigidly a pinion 138 in mesh with a spur gear 139 on a shaft 140. This shaft is driven by means of spur gearing 141, a shaft 142, and bevel gearing 143 from a shaft 144 journaled radially in the pillar 58 and receiving its motion from the shaft 61 by bevel gearing 145 (Figs. 7 and 11).

The shaft 140 carries a number of cams for operating the various instrumentalities of the label pick-up, gumming and transfer mechanism. The valve 131 is carried by a lever 146 fulcrumed at 147 and pulled away from the connector 129 by a spring 148, as illustrated by Fig. 3. This lever 146 has an arm 149 movable between two longitudinally adjustable stops 150 carried by a rod 151 pivotally connected at 151′, near its upper end, with a link 15′ fulcrumed on the frame at 151a. The lower end of this rod is pivotally connected with a lever 152 fulcrumed at 153 and carrying a roller 154 in operative engagement with a cam 155 on the shaft 140. A spring 156 pulls downward on the rod 151 to hold the roller 154 against the cam 155.

The suction head 127 (Figs. 3, 4, 8) is secured to a vertical rod 157 movable in a guide 158 forming part of a carriage 159 provided at the middle on one side (Fig. 1) and at each end on the other side with two superposed rollers 160 running on stationary parallel rails 161. The carriage is also provided with a boss 162 within which a rod 163 (Fig. 5) is adapted to slide in a direction parallel to the rails 161. Springs 164 tend to hold the rod 163 in a normal position relatively to the carriage, and the tension of these springs may be adjusted by means of tubular nuts 165 screwing into the boss 162. The rod 163 is made rigid with a rack bar 166 suitably guided relatively to the carriage, as indicated at 167. The rack bar 166 is in mesh with a spur gear 168 on a shaft 169 which also carries a pinion 170 in mesh with another rack bar 171 having a forked lower end 172 guided on the shaft 140 while the upper portion of the bar 171 is guided by a cross bar 173. On this bar 171 is journaled a roller 174 engaging a cam groove 175 in the spur gear 139.

A spring 176 (shown best in Fig. 3) tends to pull the rod 157 and the suction head 127 downwardly. On opposite sides of said rod, near its upper end, at different levels, are mounted rollers 177, 178 rotating about horizontal axes. The lower roller 177 is adapted to ride at times on transverse projections 179 secured to the ends of an arm 180 carried by a rock shaft 181. On this shaft is secured another arm 182 (Fig. 3) pivotally connected at 183 with a rod 184, the lower end of which straddles the shaft 140 and carries a roller 185 moving in a cam groove 186 on the face of a cam disk 187 secured to the shaft 140.

The upper roller 178 (Fig. 8) is adapted to engage at times a stationary track member 188. Above this member and in engagement therewith, is an upper track member 189 which in one of its positions (Figs. 1, 8 and 9) is to one side of the path of said roller 178, so as to be clear of such roller. The track member 189 may however be moved inwardly so as to come into the path of the roller 178. For this purpose two pins 190 project from the lower member 188 into parallel oblique slots 191 in the upper member 189. Furthermore, said upper member is provided with a transverse slideway 192 (Fig. 8) into which projects a ball 193 at the lower end of a crank arm 194 secured to a rock shaft 195 journaled in stationary bearings. The shaft 195 extends transversely to the path of the carriage 159. It will be evident that rocking the shaft 195 will move the ball 193 lengthwise of said path, imparting a like motion to the upper member 189, but owing to the oblique slots 191 such longitudinal motion of the member 189 will be accompanied by a transverse motion of said member, the slideway 192 sliding on the ball 193. Thus the inner edges of the two members 188, 189 may be brought into registry (Fig. 4). The shaft 195 is operated at the proper times by a rod 196 (Figs. 3 and 14) the upper end of which is connected pivotally at 197 with a crank arm 198 rigid on said shaft. The lower end of the rod 196 is connected pivotally at 199 with an arm 200 (Fig. 3) fulcrumed at 201 and carrying a roller 202 in engagement with the peripheral cam surface of the cam disk 187. A spring 203 keeps the roller 202 against said cam surface. The rock shaft 195 is further provided with an arm 204 secured thereto rigidly and having a notch 205 (Fig. 14) in which is adapted to be caught a pin 206 on an arm 207 rigidly secured to the lever 146. The carriage 159 is also provided with two longitudinally-adjustable screws or pins 208 (Fig. 5) arranged to stop the carriage by engagement with stationary transverse frame members 209. These members also carry tubular longitudinal projections 210 the open ends of which face each other and are adapted to receive at times the ends of longitudinal projections 211 on the carriage 159, these projections 211 being preferably also adjustable lengthwise, and normally held in position by any suitable means, for instance set screws such as indicated at 212 in Fig. 8. The parts 210, 211 co-operate after the fashion of dash-pots and pistons to check the motion of the carriage toward the ends of its travel.

At 213 (Figs. 3 and 5) I have indicated a tank containing glue or other suitable adhesive in liquid or pasty form, and at 214 a roller which dips into said adhesive and transfers it to the gumming roller 215, these rollers being rotated by mechanism referred to below. The lower roller 214 may be adjusted toward and from the gumming roller 215 by mounting the former on arms 216 fulcrumed at 217, and adjusting screw 218 serving to swing said arms, while a lock nut 219 secures them after adjustment. Preferably the tank 213 may be swung aside for filling or cleaning, by mounting it on a movable carrier 220. As mechanism for this purpose is well-known in the art, I have not illustrated its details, but the elements indicated at 221 form part of such mechanism.

The gumming roller 215 (and through it, the transfer roller 214) may be rotated by means of a chain 222 (Fig. 4) connecting a sprocket 223 on the shaft of the roller 215 (Fig. 3) with a sprocket 224 (Fig. 4) rigid on the shaft 137.

Even when the machine is stationary (so that the shafts 144, 142, 140 do not rotate), the rollers 214, 215 will continue to rotate, since the motor 135'' is rotated continuously, driving the shaft 137 (Fig. 4) through the pawl 136' and the ratchet wheel 137'. The pawl 138'' slips on the stationary sleeve 138', while the shaft 137 drives sprocket 223, and the gumming roller 215 by means of the chain 222. Thus the rollers 214, 215 are kept in motion, so that the adhesive on them will not be permitted to set, dry, or harden when the other parts of the machine are stationary.

During the normal operation of the machine, as the shafts 140, 142, 144 are rotating, the spur gear 139 on the shaft 140 rotates the pinion 138 and the sleeve 138' with the pawl 138'', at a higher rate of revolution than is imparted to the shaft 137 by the shaft 135. The pawl 138'' thus rotates the ratchet wheel 137'' and its shaft 137 with the other ratchet wheel 137' at a higher rate than that imparted to them by the pawl 136'; the latter therefore slips over the wheel 137'. It will be understood that the pawls 136', 138'' (which are spring-pressed pawls of well-known character) and the teeth of their ratchet-wheels 137' and 137'' respectively, face in the proper directions to obtain the operation described above. With the mechanism set forth, the rollers 214, 215 will be kept rotating constantly, their rotary speed being smaller when the rest of the machine is stationary than when the entire machine is in operation.

At the second station is also located a device (Figs. 1 and 7) for preventing an upward bending or curling of the side portions of the label or box covering 121, in the manner described below. This device comprises a plunger 225 (Fig. 7) having depending edge portions of flanges 226 located slightly farther apart than the sides 51 of the box body 50 (Fig. 19). Said plunger is secured rigidly to an arm 227 extending through a slot 58' in the housing 58 and rigidly connected with a rod 228 mounted to slide vertically in stationary guides 229. A spring 230 urges the arm 227 downwardly, to keep a roller 231, located at the lower end of the rod 228, in contact with a cam 232 formed on the upper face of the spur gear 98.

The operations taking place at the second station are as follows:

The extreme outward position of the carriage 159 is slightly to the right of the one shown in Fig. 5, and bring the suction head 127 into registry with the magazine 122 containing the box coverings 121, the roller 177 at this time resting on the outer projection 179 (the one shown at the right in Fig. 5), which is moved downwardly by a proper movement of the rock shaft 181 to allow the suction head to be lowered by the spring 176, into contact with the uppermost box covering 121 in the magazine 122. At this time, the valve 131 (Fig. 3) is open, and the rod 151 is in its upper position. The upper track member 189 is in its active position, in which it is adapted for engagement with the roller 178. It will be understood that when the valve is open, and as long as there is no box covering 121 on the suction head 127, the suction existing permanently in the tube 132 draws air both through the side opening of the chamber 130 and through the tube 128. When however, the suction head has its bottom opening closed by the box covering picked up from the magazine 122, all the air sucked by the pump through the tube 132 must enter through the side opening of the chamber 130. The suction at this opening thus becomes more powerful, so as to be able to overcome the power of the spring 148 when the rod 151 is moved downward to permit swinging of the lever 146 in the valve-closing direction. It will be understood that the valve is brought to the closed position, not by the positive action of the rod 151, but by the suction exerted through the lateral opening of the chamber 130 when a box covering is picked up by the suction head 127. Therefore, should said head for any reason fail to pick up such a box covering, the suction through the lateral opening of the chamber 130 will not be strong enough to close the valve, and the latter (notwithstanding the downward movement of the rod 151) will remain in its open position (Fig. 3) thereby keeping the arm 204 locked in a position which corresponds to the active position of the track member 189. If, however, a box covering has been picked up properly, the valve 131 will be closed by the increased suction, thus releasing the arm 204 and causing the track member 189 to be moved to its inactive position by the spring 203, in conjunction with the respective cam mechanism. It will be understood that the downward movement of the rod 151 is not of sufficient extent to close the valve 131 by a downward pressure of the upper stop 150, but the valve is closed by suction alone. It will be understood that the covering 121 is held firmly against the suction head 127 by the suction in tube 128. The arm 180 is then swung so as to raise the right hand projection 179 and with it the roller 177 and the suction head 127 with the box covering 121 adhering thereto, the upper roller 178 being thereby brought to a position above the stationary track 188, the movable track 189 as stated being at this time in the inactive or retracted position shown in Fig. 9, and therefore clear the path of said roller 178. The carriage 159 then moves inwardly (toward the left), the track 188 holding the suction head 127 at such a level that the lower surface of the box covering 121 adhering thereto will be brought in contact with the gumming roller 215 as the carriage 159 passes from the position shown in Fig. 5 to the one shown in Fig. 3. During this movement, as the box covering is about to clear the gumming roller 215, the inner or left-hand projection 179 comes under the roller 177, the outer or right-hand portion of said projection being beveled as shown in Fig. 3 to insure an easy passage of said roller on to the upper surface of said projection. When during the inward movement of the carriage 159 the roller 178 drops off the track 188, the level at which the suction head 127 travels is governed by the inner projection 179, and as the carriage approaches its innermost position (Fig. 3) the arm 180 is rocked to move said projection downwardly, out of contact with the roller 177, the spring 176 pressing the suction head 127 and the box covering 121 carried thereby, against the bottom 50 of the box body resting on the plate 92'. At this time, the rod 151 is given an upward movement, to the position shown in Fig. 3. As soon as the lower stop 150 lifts the lever arm 149, the valve 131 is opened, the spring 148 assisting such movement, and since the suction which holds the box covering 121 against the suction head 127 is reduced considerably by the opening of the valve 131, the adhesion of said box covering to the box bottom will be sufficient to keep the covering from being lifted during the subsequent upward movement of the suction head. At about the same time with the upward movement of the rod 151, the rod 196 is moved upwardly by the respective cam mechanism, to the position shown in Fig. 3, in which the rock shaft 195 brings the movable track member 189 into proper position to be engaged by the roller 178. The movements of the valve 131 and of the rock shaft 195 just referred to, bring the pin 206 into locking engagement with the notch 205 (Figs. 3 and 14), so that the rod 196 can not move downwardly until it is released from such locking engagement, as set forth below. The suction head 127 is lifted by the arm 180 rocking to raise the inner projection 179 against the roller 177, until the roller 178 is at about the level of the track member 189, or slightly above. The carriage 159 then performs its outward movement (toward the right) during which the suction head 127 travels at a higher level than during its inward movement, and therefore remains clear of the gumming roller 215, so as not to be soiled by adhesive. As stated above, the adhesion of the gummed lower surface of the box covering 121 to the box bottom 50 prevents the said covering from following the suction head in its upward movement. At about this time, the plunger flanges 226 move down to give a slight downward bend to the two opposite sides of the covering 121 designated a in Fig. 20. The purpose of this is to counteract the tendency of these two sides to curl upwardly owing to the effect of the moist adhesive; the other two sides have practically no tendency to curl.

During the outward movement of the carriage 159, at about the time the upper roller 178 comes to the right hand end of the track member 189, the lower roller 177 comes into registry with the outer projection 179 (the inner edge of which is beveled), and said projection becomes the support of the suction head 127. As the carriage approaches its outermost position, the operation of closing the valve 131 and retracting the movable track member 189 at the time of picking up a box covering will be repeated substantially as described above. Under normal conditions therefore, the suction head, after picking up a covering, will travel inwardly at the level of the gumming roller 215, and will then return, without such covering, at a higher level. It will be noted, however, that if the suction head fails to pick up a box covering 121, the valve 131 will not close, and the arm 204 will remain locked in the position corresponding to the active position of the movable track member 189. In case of such failure, therefore, the suction head will travel at the higher level during its inward movement as well as during the outward movement, thereby preventing the suction head from becoming soiled by contact with the gumming roller during the inward movement, which contact would occur if the suction head were allowed to travel inwardly at the lower level, in the event of no covering having been picked up by the said head.

At the third station (see particularly Figs. 1, 6, 13, 21, 23, 24, 25 and 26) the sides of the box covering 121 are bent against the sides 51 of the box body. A plate 233 (Fig. 25) is adapted to press down on the box covering 121 so as to hold it smoothly against the bottom 50 and remove any wrinkles. This plate is secured to two rods 234 (Figs. 6, 23, and 24) extending upwardly to a weight 235, which supplies the downward pressure for the plate 233. Between the rods 234 extends a lever 236 fulcrumed at 237 on a stationary bracket 238. By a link 239, the inner end of the bar 236 is connected with a rod 240 mounted to slide vertically in stationary guides 241. This rod carries a roller 242 engaging a cam groove 243 in the periphery of a cylindrical member 244 rigidly secured to the shaft 61. The outer end of the lever 236 is pivotally connected at 245 with a rod 246 having a like connection at 247 with a rod 248 slidable vertically in stationary guides 249. The rod 248, or at least its upper portion, is square to engage the lower ends of sleeves 234' which are either fast or loose on the rods 234, while the weight 235 is rigidly secured to said rods 234. It will be understood that the upper end of the rod 248 will at times engage the sleeve 234' from below and lift them with the weight 235 and rods 234, thereby raising the pressure plate 233 off the box covering 121. To the lower end of the rod 248 is secured a plate 250, which at one side carries a vertical rod 251 mounted to slide in a stationary guide 252, the plate 250 being thus held against rotation. The lower end of the rod 248 also carries rigidly a lower plate 253 (Fig. 25) and a partition plate 254. The lower surface of the upper plate 250 is provided with an annular groove 255, adjacent to the partition plate 254, and a similar groove 256 is provided in the upper surface of the lower plate 253. In the latter there are provided four horizontal slideways 257 in which are movable radially slides 258 and 259 to which are pivoted carriers 260, 261 respectively, at the lower portions of which are journaled about horizontal axes, the folding or wrapping rollers 262, 263 respectively. The rollers 262, which are parallel to each other, are located at a higher level than the rollers 263, which latter extend transversely to the rollers 262 and are adapted to engage those sides of the box covering 121 which have projections or tabs b at their corners. Springs 264 pull the carriers 260, 261 inwardly but enable them to yield outwardly as the respective rollers engage and press the box covering on the sides 51 of the box body. From each of the slides 258, 259 a pin 265 extends upwardly through a suitable opening in the lower plate 253 into an oblique or cam slot 266 in a plate or ring 267 mounted to rock in the annular groove 256. It will be evident that rocking the plate 267 in one direction or the other will move the slides 258, 259 inwardly or outwardly. Such rocking movement is obtained as follows: The plate 267 has an extension 267' (Fig. 13) having a connection with a vertical rod 268, along which the extension 267' slides in its up and down movement, said rod being carried by an arm 269 on a vertical rock shaft 270 and being held to rock with said shaft. To the shaft 270 is secured rigidly an arm 271 pivotally connected at 272 with an actuating member 273 the forked inner end of which straddles the shaft 61, while the intermediate portions carries a roller 274 extending into a cam groove 275 in the upper surface of a disk 276 secured rigidly to the shaft 61 (Fig. 6).

The upper plate 250 has two radial guideways 277 in line with each other and in the same direction in which the slides for the lower rollers 263 travel. In these guideways are movable slides 278 carrying uprights 279 at the lower ends of which are located transverse arms 280, each provided at its ends with tuckers 281 adapted to engage the portions or tabs $b$ of the box covering (Fig. 20). Each slide 278 has a pin 278' projecting downwardly through a suitable opening in the upper plate 250 and into an oblique or cam slot 282' in a plate or ring 282 mounted to rock in the annular groove 255. This plate is rocked by mechanism similar to that described in connection with the plate 267. That is, the plate 282 has an extension 283 slidable up and down along a vertical rod 284 carried by an arm 285 secured rigidly to the shaft 286 to which a rocking movement is imparted by an arm 287 and an actuating member 288 having a roller 289 extending into a cam groove 290 (Fig. 6).

The operations which take place at this third station are as follows: First, the pressure plate 233 is let down on the box covering 121, to smooth it. Then the lower rollers 263, in their downward movement, engage those sides of the box covering which have the tabs $b$, and force or fold them with a yielding pressure inwardly against the two corresponding opposite sides 51 (Fig. 21) of the box body, the adhesive on said sides of the box covering causing them to stick to the box body, the tabs $b$, however, remaining out of contact with the sides of the box. The further downward movement of the rod 248 brings the tuckers 281 into operative relation to the tabs $b$, and at this time the tuckers move inwardly to bend the tabs $b$ against the other sides of the box body, to which they stick (Fig. 21). Thereupon the upper rollers 262 come into engagement with the two other sides of the box covering, and fold them against the sides of the box body to which the tabs $b$ have just been applied; in other words, said other sides of the box covering are folded over the tabs $b$ and hold them in proper position. The box covering is thus glued both to the bottom 50 and to the four sides 51 of the box body, but the sides of the box covering 121 are wider than the sides of the box body, and thus the edge portions of the box covering project downwardly beyond the sides of the box body. The rod 248 rises, and the covered box body advances to the next (fourth) station.

At this fourth station, the projecting lower portions of the box covering are turned in, to a horizontal position, by the following mechanism (see Figs. 1, 2, 11, 13, 21ª, 22 and 27): As the core 90, 92' (Fig. 2) approaches this station, during the partial revolution of the sleeve 93, the roller 94 at the lower end of the rod 91 enters a horizontal groove 291 (open at both ends) on a slide 292 movable vertically in a stationary guide 293, said slide being provided with a roller 294 engaging a cam groove in the face of a disk 295 rigidly secured to a shaft 296 straddled by the forked lower portion of said slide (see Fig. 11). This shaft 296 aligns with the shaft 57 and is driven from the central shaft 61 by bevel gearing 297. By this mechanism, the core 90 with the covered box thereon is lifted off the plate 92' to a position such as shown in Fig. 22, with the core 90 filling only about one-half the height of the box body. At this fourth station is also located a pressure device of the same character as set forth in connection with the third station, viz. a pressure plate 298 with rods 299, a weight 300, a lever 301 fulcrumed at 302 on a bracket 303, a link 304, a rod 305 movable vertically in guides 306, and a roller 307 engaging a cam groove 308. The lever 301 is pivotally connected at 309 with a rod 310 having a like connection at 311 with a rod 312 sliding vertically in stationary guides 313. The lower end of the rod 312 carries two plates 314, 315 of which the lower plate has, in its upper face, an annular recess in which a plate or ring 316 (Fig. 22) is mounted to rock about the axis of the rod 312. The upper plate 314 (Fig. 2) has secured thereto a vertical rod 317 sliding in a stationary guide 318. The lower face of the lower plate 315 has four radial guides 319 (Fig. 22) in which are movable horizontally slides 320. Each of these slides carries a spring-pressed vertical plate 321 adapted to engage the corresponding side of the box covering 121. Below said plate, each slide 320 carries a corresponding blade 322 which is brought inwardly by the corresponding movement of the slide 320, when the plates 314, 315 have been lowered to the position Fig. 22, in which the said blades are slightly below the sides 51 of the box body. Such inward movement of the slides will therefore bend or turn the downwardly projecting portions of the box covering 121 into the horizontal position indicated by the dotted lines. The slides are operated by the following mechanism: Each slide has a pin 323 extending into an oblique or cam slot 324 in the ring 316. To this ring is also secured rigidly a pin 325 (Fig. 13) extending upwardly through a slot 326 (concentric with the rod 312) in the plate 314. With the pin 325 is connected a link 327 guided at 328 and slidable up and down along a vertical rod 329 carried by arms 330 and 330' (Fig. 2) secured rigidly to a vertical rock shaft 331. On said shaft is also secured a crank arm 332, for imparting a rocking movement to said shaft by means of an actuating member 333 which at one end straddles the shaft 61 and at the other has a pivotal connection 334 with the crank arm 332. The intermediate portion of the actuating member 333 carries a roller 335 engaging a cam groove in the upper face of the same rotating member 336 (Fig. 2) the periphery of which has the cam groove 308.

After the blades 322 (Fig. 22) have turned the edges of the box covering 121 inwardly as described, the slides 320 are again moved to their outer positions, and then the core 90 is moved down into contact with the plate 92', the weighted pressure plate 298 assisting this movement. During this downward movement, as the plate 92' enters the box body, it will fold the inturned horizontal edge portions of the box covering upwardly to a vertical position against the inner surfaces of the sides 51 of the box body (Fig. 21ᵃ).

A further one-sixth of a revolution of the sleeve 93 brings the covered box body to the fifth station, where pressure is exerted inwardly against the sides of the box covering while the core 90 and the plate 92' are within the box body and form a backing for said sides. This mechanism, shown in Figs. 1, 7, 13, 17 and 18, is similar in some of its features to those located at the third and fourth stations. The following parts are substantially the same as described in connection with said previous station: The pressure plate 337 (Fig. 17) connected by rods 338 (Fig. 7) with the weight 339, the lever 340 fulcrumed at 341 on a bracket 342, the link 343, and the actuating member 344 having a roller 345 engaging a cam groove 346 (see also Fig. 6) in the upper face of the cylindrical member 244; the rod 347 pivotally connected at 348 to the lever 340 and at 349 to the rod 350 slidable vertically in stationary guides 351; the plates 352, 354 (Fig. 17) secured to the lower end of the rod 350; the slides 354 (Fig. 7) movable radially in guides on the lower surface of the lower plate 353 (Fig. 17); pins 355 extending upwardly from the slides into oblique slots 356 (Fig. 18) of a ring 357 mounted to turn in a recess of the plate 353, about the axis of the rod 350; a pin 358 extending from said ring upwardly through a concentric slot 359 in the upper plate 352 (Fig. 7); and a vertical rod 360 extending upwardly from said plate and guided in the frame at 361. With the pin 358 is connected a rod 362 (Figs. 13 and 18), preferably of telescoping character, with a coil spring 363 connecting its two members yieldingly. This rod 362 is pivotally connected with, and slidable up and down on, a vertical rod 364 carried by an arm 365 secured to a vertical rock shaft 366. This shaft also carries a crank arm 367 pivotally connected at 368 with an actuating member 369 (Fig. 7) straddling the shaft 61 and carrying a roller 370 engaging a cam groove in the upper face of the cam 120. Each of the slides 354 (Fig. 17) has a bracket 371 (preferably adjustable in a radial direction) carrying at its lower end a pressure plate 372.

The operation of the press provided at the fifth station will be understood readily. The rod 350 (Fig. 7) is lowered with the sides 354 in their outer positions, so that the pressure plates 372 will not touch the covered box body. Then the plates are moved inwardly to press against the sides and cause the box covering to adhere very firmly to the sides 51 of the box body both on the inside and on the outside. Then the plates 372 are moved outwardly, and raised again with the rod 350, thus freeing the covered box for the next partial revolution.

This partial revolution brings the core with the finished covered box body to the sixth and last station, at which the finished article is ejected by the following mechanism (Figs. 1, 6, 13, and 16): At this station, the roller 94 (Fig. 6) enters a horizontal groove 373 (open at both ends) on a slide 374 movable vertically in a stationary guide 375. The lower end of the slide straddles a horizontal shaft 376 extending radially with respect to the central shaft 61 and connected therewith by bevel gearing 377. The slide 374 carries a pin or roller 378 engaging a cam groove on the adjacent face of a disk 379 rigidly secured to said shaft, so that the slide 374, and with it the core 90, will be raised and lowered at the desired times. The upward movement of the core 90 will raise the covered box body to the position indicated by dotted lines in Fig. 16, in which the lower edge of the (inverted) box body is just above retaining hooks 380 at the lower ends of normally vertical (preferably elastic) holders 381, said hooks having beveled inner surfaces so that they will yield as the box body is lifted, snapping back into a holding or supporting position as soon as the box body reaches the position indicated. The holders 381 are carried by a stationary platform 382 having guides 383 (Fig. 6) for a slide rod 384 movable radially. Said rod has rigidly secured to it the ejector proper 385, which is a vertical plate depending from the rod 384, to push the finished article off the hooks 380 and on to a stationary plate 386, preferably rounded or bent downward at its inner end, to facilitate the transfer of the article to said plate. The holders 381 (Fig. 16) are preferably adjustable toward and from each other, as by making them with slots receiving set screws 387, so as to adjust them properly when cores 90, 92′ of different sizes are substituted. The slide rod 384 (Fig. 6) is reciprocated at the proper times by a link 388, pivotally connected at 389 with said rod, and at 390 with a lever 391 fulcrumed on the machine at 392. At 393 the lever 391 is connected pivotally with a link 394, having a like connection at 395 with an actuating member 396 the inner end of which straddles the shaft 61, while its intermediate portion carries a roller 397 working in a cam groove 398 of a disk rigidly secured to said shaft.

The operation of the ejector mechanism will be understood readily without any further explanation, it being understood that the upward and downward motion imparted to the core 90 by the cam disk 379, and the outward and inward movements given to the slide rod 384 by the cam 398, are timed to produce the results described above.

In addition to the mechanism described above, the machine has a number of auxiliary parts as follows: In Fig. 1 we have indicated a catch 399 pivoted at 400 about a horizontal axis and adapted to be swung down into engagement with a suitable notch 76′ in the upper face of the bar 76, to hold said bar in its outer, inoperative position when it is desired to run the machine (as for a test to determine whether its parts are working properly) without feeding any box bodies. When the catch is in position, the bar 76 will not reciprocate and thus the conveyer 53 will simply slip under the box bodies, the foremost box body being held stationary owing to its engagement with the stop bar 73.

The following mechanism is provided to lock the rotary sleeve 93 and the parts carried thereby against accidental motion after each partial revolution: Said sleeve has six holes 401 (Fig. 10) equally spaced around its periphery and in the same plane of rotation, while the stationary pillar or housing 58 has one hole 402 with which the individual holes 401 come into registry successively after each partial revolution of the sleeve 93. The sleeve 93 is adapted to be locked by the end of a slide 403, which end is adapted to project through the hole 402 into the particular hole 401 which at that time registers with the hole 402. The slide 403 (Fig. 6) straddles the shaft 61 and is guided in stationary brackets 404. In order to move the slide into and out of locking position, a roller 405 carried by the slide engages a cam groove 406 on a member rigidly secured to the shaft 61.

It is also desirable at times to move the machine much more slowly than when it is driven by the motor 69, such slow movement being employed for instance to adjust the parts very accurately, particularly when the machine has been adapted to the manufacture of boxes of a different size. It will be understood that the parts 90, 92′ can be readily removed and corresponding parts of a different size substituted, and the mechanisms co-operating with the cores 90, 92′ can also be adjusted to correspond to the dimensions of the box bodies employed in each particular case. The machine is therefore adapted to handling boxes of different sizes, within a relatively considerable range. For the purpose of giving the machine the slow movement referred to above, I have provided the mechanism shown in Figs. 1 and 7. At 407, I have indicated a hand wheel secured rigidly to a shaft 408 which is movable lengthwise so that a pinion 409 on said shaft may be brought into or out of mesh with a gear 410 on the shaft 65. Normally, the pinion 409 is out of mesh with the gear 410, as shown. The inner end of the shaft 408 is in engagement with a lever 411 fulcrumed at 412. A link 413 connects the lever 411 with an arm 414 upon a vertical rock shaft 415. A rod 416 connects said arm 414 with the clutch lever 417 fulcrumed at 418 and adapted to shift the clutch 66 which controls the connection of the driving pulley 67 with the shaft 65. As previously stated, a spring 70 normally keeps the clutch engaged, and this spring also holds the shaft 408 in its outer position so as to disengage the pinion 409 from the gear 410. When the shaft 408 is moved inwardly to bring the pinion 409 into mesh with the gear 410, the lever 417 is operated at the same time through the lever 411 and its connections in such a direction as to disengage the clutch 66 from the pulley 67. Therefore, when the parts 407, 408, 409 are moved into position for the slow manual adjustment, the clutch 66 is thrown out automatically so as to avoid the danger of breakage or injury which would be present if power drive and manual drive were in mesh at the same time. Furthermore, as stated above, whenever the clutch 66 is in the operative position, the manual adjustment drive 409, 410 is automatically held in the inactive position.

We claim:

1. A box-covering machine comprising a rotary carrier, cores mounted on said carrier at 60° from each other and adapted to support box bodies and covers therefor, means for giving said carrier intermittently partial rotations of 60° each, and six devices located adjacent to the periphery of the carrier at points corresponding to those at which the cores are temporarily stationary between said intermittent partial rotations, the first of said devices serving to feed box bodies to the cores, the second to feed box covers and apply them in a flat condition to said box bodies, the third to bend all the sides of the covers against the box bodies, the fourth to bend the projecting ends of the cover sides first parallel to the bottom of the box body and then into the box body, the fifth to exert binding pressure on the covered box body, and the sixth to eject the covered box body.

2. A box-covering machine comprising a movable carrier, cores mounted on said carrier at equal distances from each other and adapted to support box bodies and covers therefor, means for giving said carrier intermittently successive movements of an extent corresponding to the distance between adjacent cores, and six devices located adjacent to the carrier at points corresponding to the positions taken by the cores when they are temporarily stationary between said intermittent successive movements, the first of said devices serving to feed box bodies to the cores, the second to feed box covers and apply them in a flat condition to said box bodies, the third to bend all the sides of the covers against the box bodies, the fourth to bend the projecting ends of the cover sides first parallel to the bottom of the box body and then into the box body, the fifth to exert binding pressure on the covered box body, and the sixth to eject the covered box body.

3. In a box-covering machine, a mechanism for turning in the projecting edges of a box cover applied to a box, said mechanism including a box support, a carrying member arranged to reciprocate toward and from said support, slides carried by said member and movable thereon inwardly and outwardly in a direction transverse to the path of said member, blades carried by said slides and adapted to engage the projecting edges of a box cover, and plates likewise carried by said slides and adapted to engage the sides of the box cover where such sides are in contact with the box body.

4. A turning-in mechanism according to claim 3, in which the plates carried by the slides are spring-pressed and yieldingly movable relatively to the slides in the directions of their sliding movement.

5. In a box-covering machine, a mechanism for applying box covers to box bodies, said mechanism comprising a magazine for box covers, a support for box bodies, a carriage movable from said magazine to said support and provided with a transfer device for taking a box cover from said magazine, a gumming device arranged adjacent to the path of said carriage, means for causing said transfer device to travel at a lower level during its cover-transferring movement, in operative relation to the said gumming device, so as to gum the cover in transit, and at a higher level during its return movement, to clear the gumming device, and mechanism for causing said transfer device to travel at the higher level during its ordinarily active movement, in the event of its failure to take a box cover from the magaine, so that in the event of such failure said cover-transferring device will be kept clear of the gumming device both during the return movement and during the ordinarily active movement.

6. In a box-covering machine, a mechanism for applying box covers to box bodies, said mechanism comprising a magazine for box covers, a support for box bodies, a gumming device, a carriage movable from said magazine to said support and provided with a pneumatic suction device for taking a box cover from said magazine and carrying such cover past the said gumming device, said pneumatic suction device including a suction head, a suction conduit connected with said head and provided with an opening, a valve arranged adjacent to said opening and adapted to close the same when the suction head has picked up a box cover, but to remain in the open position when there is no box cover on the suction head, and mechanism, operatively connected with said valve, to cause the suction head, during its movement in the cover-transferring direction, to travel close to the gumming device when said valve is closed, but out of operative relation to the gumming device when the valve is open.

7. In a box-covering machine, a mechanism for applying box covers to box bodies, said mechanism comprising a magazine for box covers, a support for box bodies, a gumming device, a carriage movable from said magazine to said support and provided with a pneumatic suction device for taking a box cover from said magazine and carrying such cover past the said gumming device, said pneumatic suction device including a suction head, a suction conduit connected with said head and provided with an opening, a valve arranged adjacent to said opening and adapted to close the same when the suction head has picked up a box cover, but to remain in the open position when there is no box cover on the suction head, and tracks governing an up-and-down motion of the suction head, one of said tracks being operatively connected with said valve so that such track will be in an inactive position when the valve is closed and will permit the suction head to travel close to the gumming device, while with the valve open said track will be in its active position to keep the suction head out of operative relation to the gumming device.

8. In a box-covering machine, a mechanism for applying box covers to box bodies, said mechanism comprising a magazine for box covers, a support for box bodies, a carriage movable from said magazine to said support and provided with a transfer device for taking a box cover from said magazine, a gumming device arranged adjacent to the path of said carriage, and adapted to engage a box cover on its way from the magazine to said support, and a flanged plunger for bending sides of the box cover after the latter has been applied to the box body resting on the support, whereby curling of such sides is prevented.

In testimony whereof we have hereunto set our hands.

PAUL WERNER FLEISCHER.
MARTIN FEYBUSCH.